(12) United States Patent
Lu

(10) Patent No.: US 7,281,918 B2
(45) Date of Patent: Oct. 16, 2007

(54) INJECTION MOLDING SYSTEM

(76) Inventor: Hsiao Ting Lu, No. 293, Chung Cheng South Road, Yung Kang City (TW)

( * ) Notice: Subject to any disclaimer, the term of this patent is extended or adjusted under 35 U.S.C. 154(b) by 330 days.

(21) Appl. No.: 11/013,264

(22) Filed: Dec. 15, 2004

(65) Prior Publication Data

US 2006/0127520 A1 Jun. 15, 2006

(51) Int. Cl.
*B29C 45/76* (2006.01)
(52) U.S. Cl. ............... 425/145; 425/149; 425/150
(58) Field of Classification Search ......... 425/145, 425/149, 150; 700/200
See application file for complete search history.

(56) References Cited

U.S. PATENT DOCUMENTS 4,784,591 A * 11/1988 Ackermann ............ 425/116
5,486,106 A * 1/1996 Hehl .................... 425/145
5,811,037 A * 9/1998 Ludwig ................. 264/40.1
7,151,978 B2 * 12/2006 Giannini ................ 700/204

* cited by examiner

*Primary Examiner*—Yogendra N Gupta
*Assistant Examiner*—Emmanuel S. Luk
(74) *Attorney, Agent, or Firm*—Charles E. Baxley

(57) ABSTRACT

An injection molding system includes an injection molding machine, a pressure valve, a flow ratio control valve, a frequency converter, and the flow ratio control valve, a motor controlled by the frequency converter, a hydraulic pump connected to the motor, and an injection molding machine controller for controlling the injection molding machine and the frequency converter. Injection molding conditions and procedures for controlling operation of the pressure valve and the flow ratio control valve are analyzed. The injection molding machine controller sets a maximum output frequency for the frequency converter and a maximum flow for the hydraulic pump, preventing inappropriate operation of a user and avoiding waste of energy. The injection molding machine controller further sets a maximum speed and a minimum speed of the motor and sets a maximum speed and a minimum speed of the hydraulic pump.

3 Claims, 6 Drawing Sheets

_US 7,281,918 B2_

INJECTION MOLDING SYSTEM

BACKGROUND OF THE INVENTION

1. Field of the Invention

The present invention relates to an injection molding system. In particular, the present invention relates to an injection molding system with a frequency converter.

2. Description of the Related Art

Injection molding machines are widely used in modern industries and consume considerable electricity. The expenditure in electricity is about 30% of the overall cost of production. Different procedures require different amounts of energy, wherein the energy consumed by some procedures may be ten or more times of that by other procedures. It is therefore the most important issue to the manufacturers to reduce the energy consumption. FIG. 4 of the drawings illustrates a conventional injection molding system using a frequency converter. The injection molding system comprises an injection molding machine 1', an injection molding machine controller 11', a pressure valve 3', a frequency converter 2', a frequency converter controller 21', a motor 4', and a hydraulic pump 5'. The frequency converter controller 21' is connected to the injection molding machine controller 11'. The injection molding machine controller 11' is operable to send commanding signals to activate the frequency converter controller 21' for controlling the frequency converter 2', which, in turn, outputs low-frequency signals to control the motor 4' and the hydraulic pump 5'. The speeds of the motor 4' and the hydraulic pump 5' can be reduced to lower the energy consumption.

However, since the conditions for injection molding are set by the operator, the speed of the motor 4' is low when at a small flow operation. The speed of the motor 4' becomes low, which would cause overheating of the motor 4' after a long-term operation, leading to damage to the motor 4'. Thus, the low-speed operation of the motor 4' by the client is so arbitrary that damage to the motor 4' occurs easily. In a case that the operator increases the frequency, the energy-saving effect is adversely affected.

Normal operation of the hydraulic pump 5' has a minimum speed limitation and a maximum speed limitation. In a case that the low-speed operation is set by the operator (or the client), the life of the hydraulic pump 5' is shortened and the hydraulic pump 5' is apt to malfunction if the operating parameters are inappropriate.

The injection molding machine 1' and the frequency converter 2' are separately controlled by the injection molding machine controller 11' and the frequency converter controller 21'. Referring to FIG. 5, since the injection molding machine controller 11' has to firstly send commanding signals to control the frequency converter controller 21', and then the frequency converter controller 21' controls the frequency converter 2', there is a lag in time. As a result, the slope of motion of the injection molding machine 1' is different from that of the frequency converter 2' when the injection molding machine 1' speeds up. The lag and the different slopes of motion cause product deficiency. The responding speed is low and the production cycle is long.

Further, the minimum speed limitation to the frequency converter 2' could not be overcome. As illustrated in FIGS. 4 and 6, when in a low frequency state of the frequency converter 2', the pressure pulse is large and the pressure changes when the flow changes. Stabilization of pressure by maintaining the pressure directly affects surface mass and internal pressure of the products. However, the pressure is unstable and the product quality is adversely affected if the output frequency of the frequency converter 2' is set too low.

Whenever the pressure of the injection molding machine 1' changes during any operation, it is impossible to make the frequency converter 2' to output frequency in response to different machine types, different pressures, and/or different flow needs. In other words, the speed of the motor 4' cannot be increased to reduce the formation period during low-pressure operation.

In a high-pressure low-flow operation in high-precision injection molding process, since the frequency converter 21' receives the commanding signal regarding speed from the injection molding machine controller 11', the motor 4' and the hydraulic pump 5' operate at a low speed, which is detrimental to the motor 4' and the hydraulic pump 5'. The pressure of the hydraulic system is also unstable, failing to provide complete injection molding. As a result, use of the frequency converter 2' could not be used in high-precision injection molding.

SUMMARY OF THE INVENTION

An objective of the present invention is to provide injection molding system that consumes less energy.

Another objective of the present invention is to provide injection molding system that increases the productivity.

A further objective of the present invention is to provide injection molding system that cuts the cost.

Still another objective of the present invention is to provide injection molding system that prevents damage to the motor and the hydraulic motor resulting from inappropriate operation by the user.

An injection molding system comprises an injection molding machine, a pressure valve, a flow ratio control valve, a frequency converter connected to the pressure valve, the flow ratio control valve, and the flow ratio control valve, a motor connected to and controlled by the frequency converter, a hydraulic pump connected to the motor, means for analyzing injection molding conditions and procedures for controlling operation of the pressure valve and the flow ratio control valve, and an injection molding machine controller for controlling the injection molding machine and the frequency converter.

The injection molding machine controller sets a maximum output frequency for the frequency converter and a maximum flow for the hydraulic pump based on a type of the injection molding machine and procedures for injection molding, preventing inappropriate operation of a user and avoiding waste of energy. The injection molding machine controller further sets a maximum speed and a minimum speed of the motor and sets a maximum speed and a minimum speed of the hydraulic pump.

When a required flow is below output of the minimum speed of the hydraulic pump, the injection molding machine controller makes the frequency converter output a minimum frequency to control the motor and the hydraulic pump to operate at the minimum speeds of the motor and the hydraulic pump. The injection molding machine controller controls the flow ratio control valve to control the required flow of a motion.

When the required flow is higher than the output of the minimum speed of the hydraulic pump, the actual flow is controlled by the frequency converter that controls operation of the motor and the hydraulic pump.

When a pressure required in the motion is low, the injection molding machine controller increases the frequency of the frequency converter and controls the motor and the hydraulic pump to increase the output of the hydraulic pump within the maximum speed of the hydraulic pump, thereby increasing the speed.

A speed-up key may be provided for increasing the frequency of the frequency converter, increasing the speed of a motion at low pressure, and shortening a period of the motion. The injection molding machine has a slope of motion the same as that of the frequency converter.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
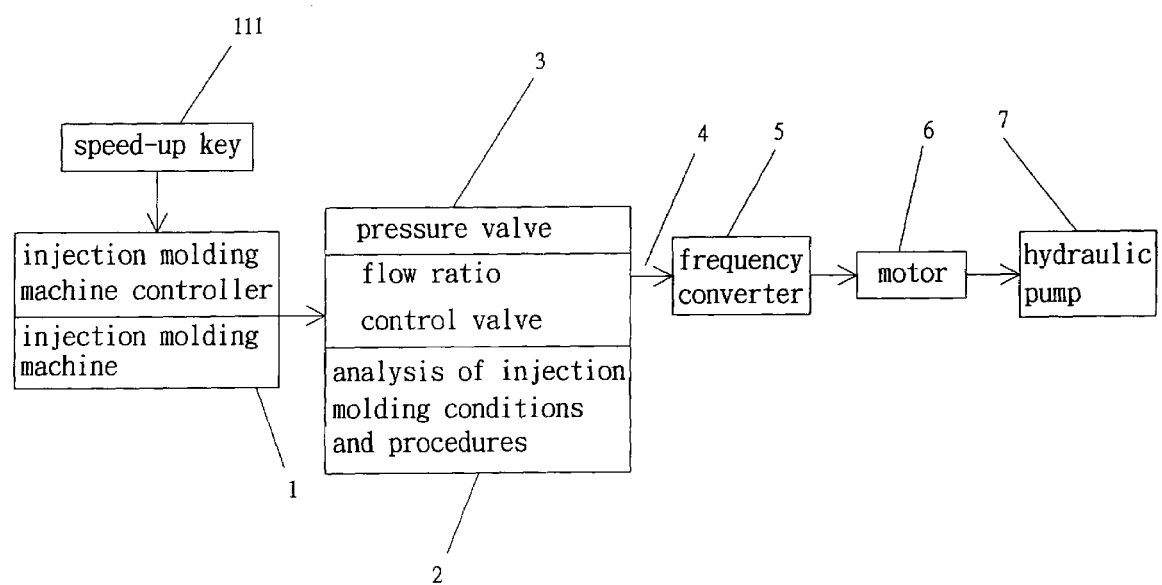
FIG. 1 is a block diagram illustrating an injection molding system in accordance with the present invention.

Referring to FIG. 1, an injection molding system in accordance with the present invention comprises an injection molding machine 1, an injection molding machine controller 11, a pressure valve 3, a flow ratio control valve 4, means for analyzing injection molding conditions and procedures 2, a frequency converter 5, a motor 6, and a hydraulic pump 7. The injection molding machine controller 11 operates in response to different injection molding conditions and procedures and controls operation of the pressure valve 3, the flow ratio control valve 4. The injection molding machine controller 11 further controls operation of the injection molding machine 1 and the frequency converter 5 that is connected to the motor 6 and the hydraulic pump 7.

Figure 2:
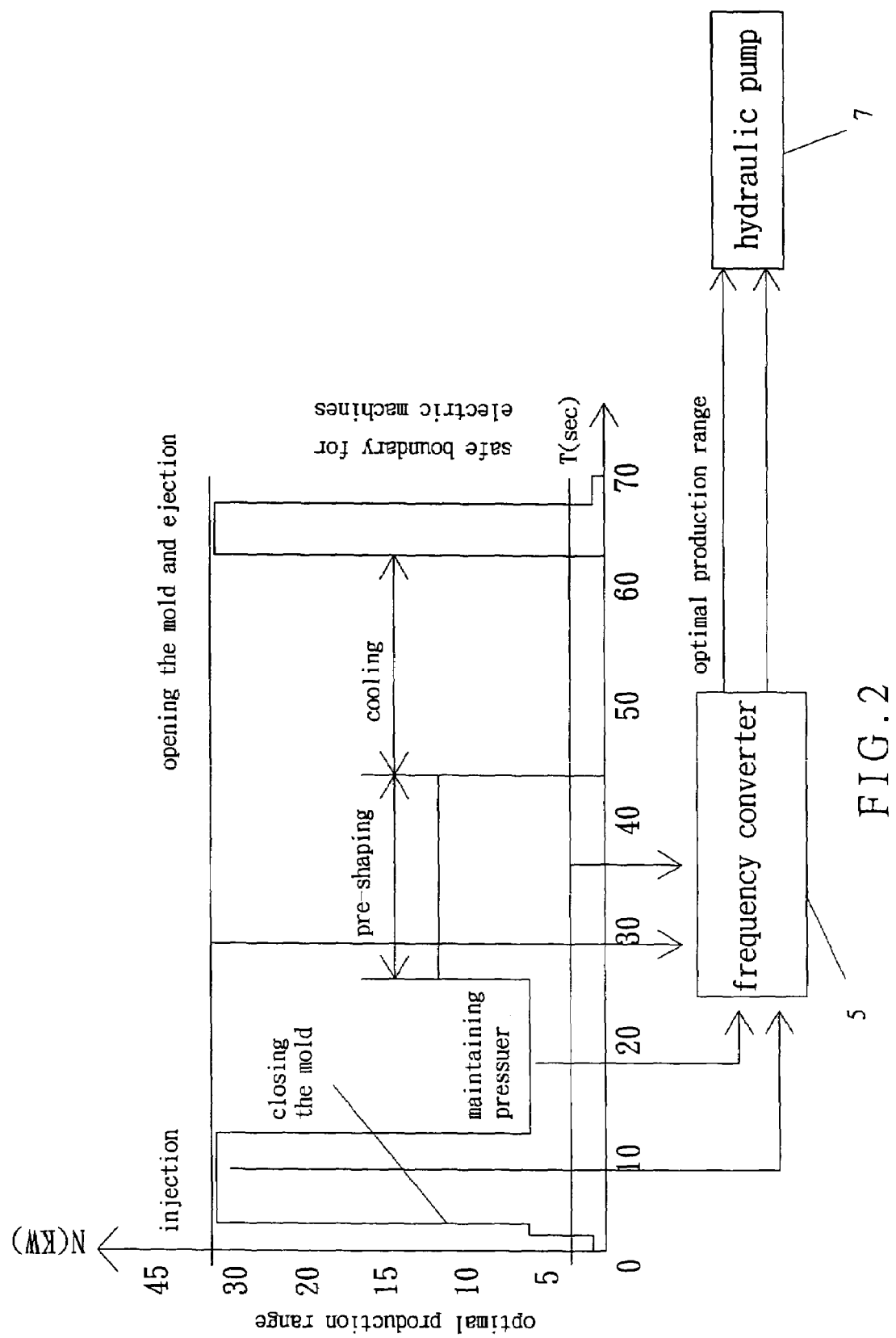
FIG. 2 is a diagram illustrating analysis of injection molding conditions and procedures of the injection molding system in accordance with the present invention.

Referring to FIGS. 1 and 2, injection molding machines 1 of different types are listed and classified to analyze different conditions of injection molding, such as closing the mold (multiple stages), feeding the injection molding seat, maintaining pressure (multiple stages), pre-shaping, cooling, withdrawing the injection molding seat, opening the mold (three stages), and releasing the mold. The area of the hydraulic cylinder, the oil to be output by the motor 6 and the hydraulic pump 7 are calculated. The required maximum flow of the oil of the hydraulic pump 7 is calculated based on the maximum speed and the limitation to the maximum speed.

The upper limit to the output frequency of the frequency converter 5 for each motion in the injection molding machine 1 is set according to the required maximum flow. This upper limit must be greater than the output of the hydraulic pump 7 at the lowest speed. Thus, even the setting values of different operators for different operations are set too high, waste of energy can be lowered, as the upper limit to the output frequency is set.

In a case that the lowest frequency of the frequency converter 5 is so set by the injection molding machine controller 11 that the speed of the motor 6 is always not smaller than the lowest speed required for the lowest speed operation of the hydraulic pump 7, the minimum flow of the oil in the hydraulic pump 7 fulfills the basic flow in the piping, preventing unstable pressure due to pressure drop resulting from low speed.

The maximum speed and the minimum speed of the hydraulic pump 7 are set in the injection molding machine controller 11. In other words, when the flow is set to be lower than the lowest speed of the hydraulic pump 7, the injection molding machine controller 11 makes the frequency converter 5 output a frequency in response to the lowest speed of the hydraulic pump 7. In this case, the actual flow in the procedure is controlled by the flow ratio control valve 4, which, in turn, is controlled by the injection molding machine controller 11. Thus, the motor 6 and the hydraulic pump 7 can operate safely at the minimum speed. Damage to the motor 6 and the hydraulic pump 7 resulting from overheating is avoided.

In a case that the flow required by the injection molding machine 1 is greater than the safe lowest speed of the hydraulic pump 7, the injection molding machine controller 11 orders the frequency converter 5 to output required speed for the motor 6 and the hydraulic pump 7. In this case, the flow ratio control valve 4 is fully open under the control of the injection molding machine controller 11.

The output power to which the output frequency of the frequency converter 5 corresponds is expressed by a mathematic equation, wherein the output frequency of the frequency converter 5 is expressed by the following equation:

$$HZ = K \times P \times Q$$

wherein K is a factor, P is the preset pressure, and Q is the preset flow.

The optimal energy-saving frequency is correlated to the load as well as the flow. In a case that the pressure required for operating the injection molding machine 1 is low, the output of the hydraulic pump 7 is increased by increasing the speed of the hydraulic pump 7 under the control of the frequency converter 5 within the maximum speed limitation of the hydraulic pump 7. The speed is increased and the efficiency is improved. Further, damage to the motor 6 due to overload resulting from excessive pressure and excessive flow set by the operator can be avoided.

Since the pressure required in general conditions for formation is below 70-90 kg, larger pressure is only required in few conditions. Thus, a speed-up key 111 can be added on the injection molding machine controller 11. When the speed-up key 111 for shortening the formation period is pressed, the pressure upper limit is controlled within 80-100 kg. In this case, the injection molding machine controller 11 outputs a signal to the frequency converter 5 to increase the frequency by 40%-75%. The flow and the processing speed are thus increased by 40%-75%. The production efficiency and product quality are improved. The pressure of the system is set to be 140 kg. However, the situation varies when the pressure of the system changes.

Figure 3:
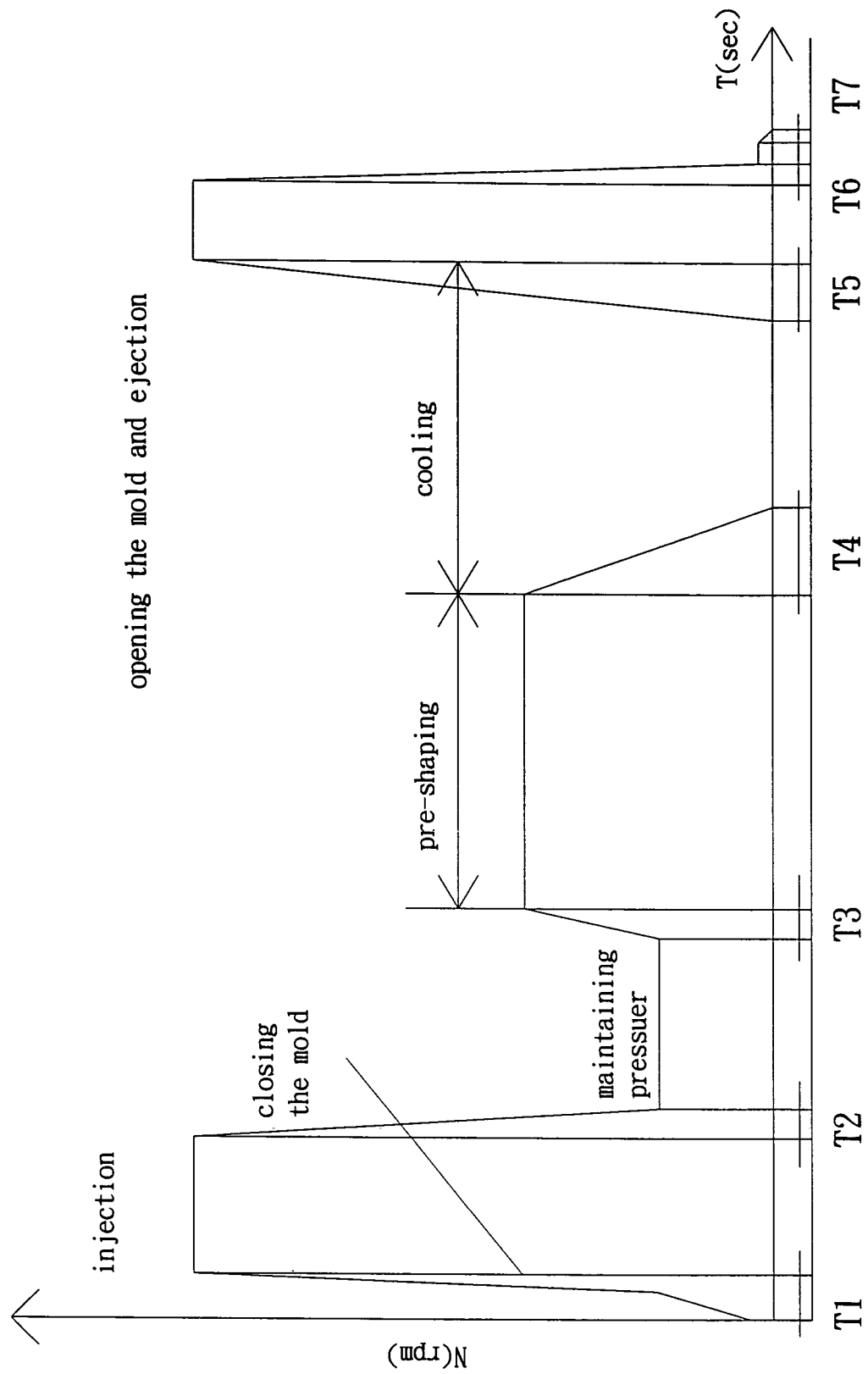
FIG. 3 is a diagram illustrating coincidence of a slope of motion of an injection molding machine and a slope of motion of a frequency converter of the injection molding system in accordance with the present invention.
Figure 4:
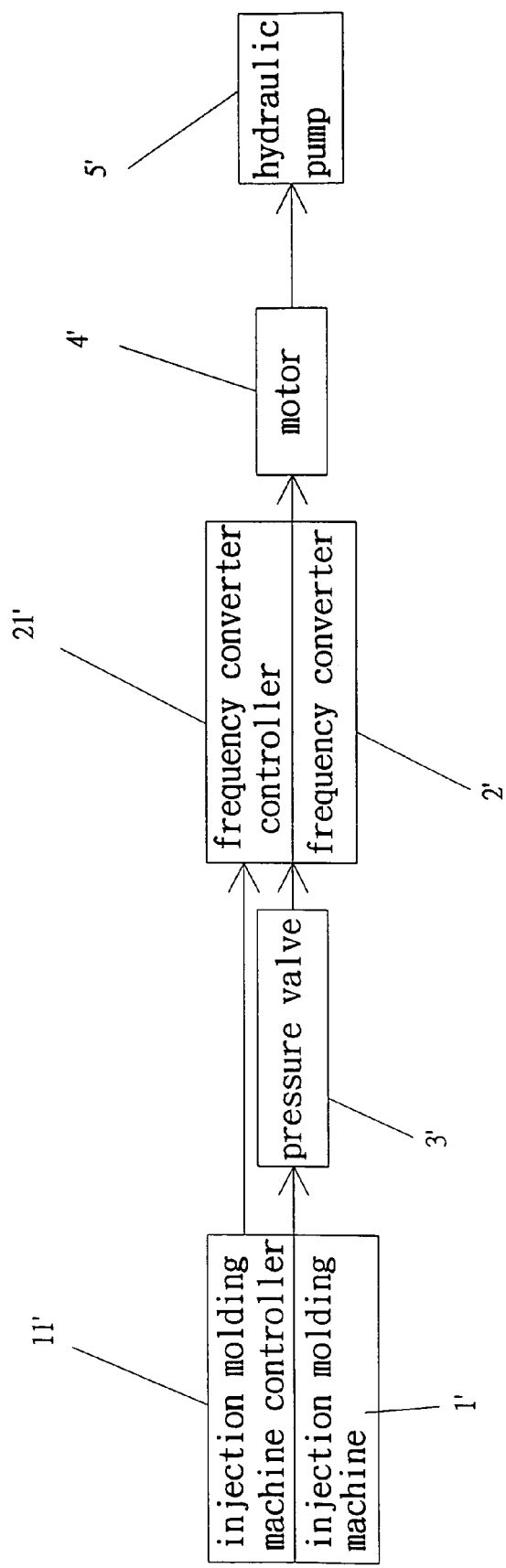
FIG. 4 is a block diagram illustrating a conventional injection molding system.
Figure 5:
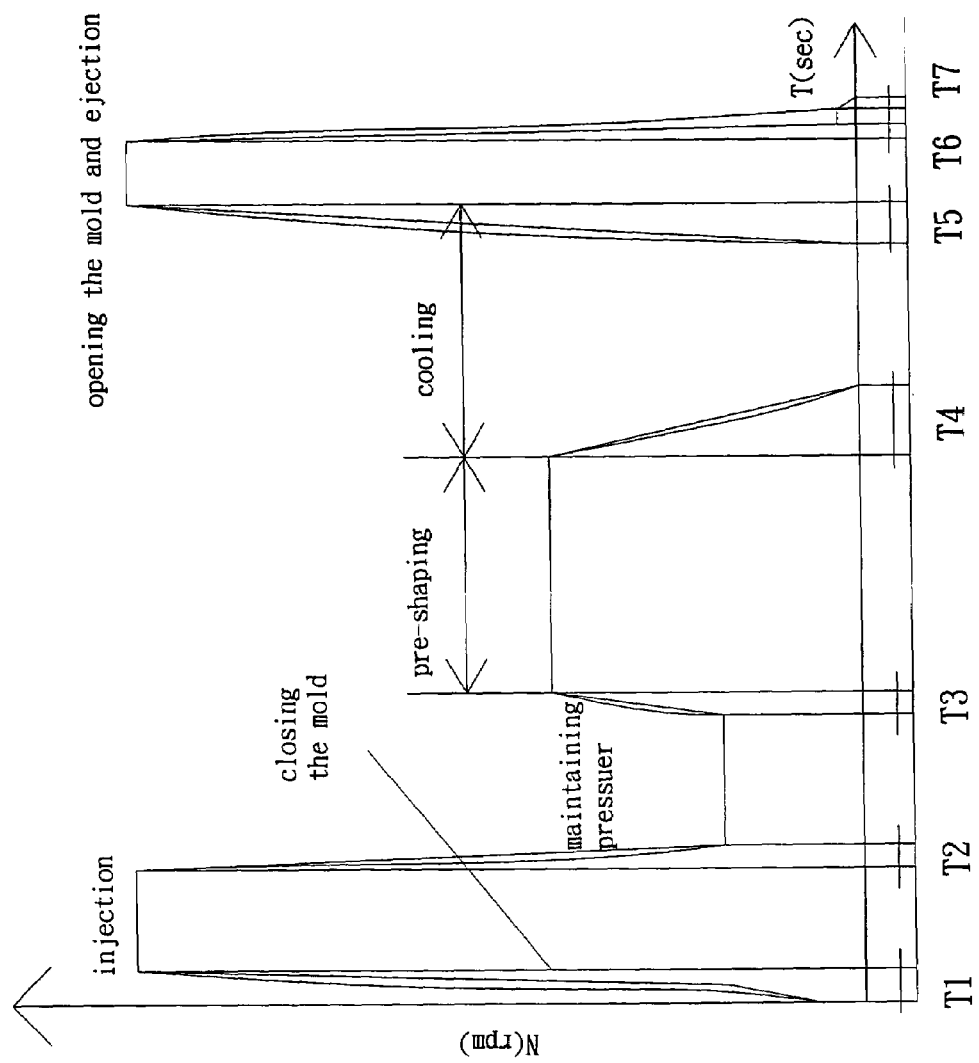
FIG. 5 is a diagram illustrating different slopes of motion of an injection molding machine and a frequency converter of the conventional injection molding system.
Figure 6:
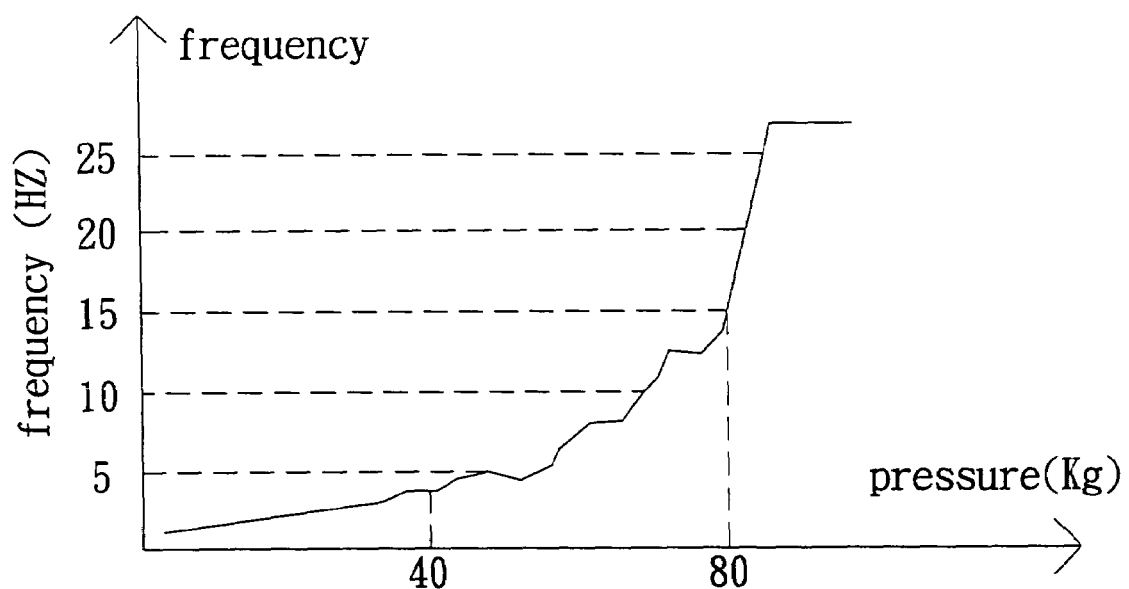
FIG. 6 is a diagram illustrating unstable pressure when the frequency converter in FIG. 5 is at a low frequency.

As illustrated in FIGS. 1 and 3, since the frequency converter 5 is controlled by the injection molding machine controller 11, the adjustment of the slope of motion of the injection molding machine 1 and is the same as that of the slope of motion of the frequency converter 5. In other words, existence of two different slopes of motion would not occur, as control of the frequency converter 5 and control of the injection molding machine controller 11 are integrated. The production efficiency and the product quality are improved, which is suitable for high-precision injection molding.

Since the frequency converter 5 is given a minimum speed limitation, unstable system pressure would not occur under stable flow.

Although a specific embodiment has been illustrated and described, numerous modifications and variations are still possible without departing from the essence of the invention. The scope of the invention is limited by the accompanying claims.

What is claimed is:

1. An injection molding system comprising:
    an injection molding machine;
    a pressure valve;
    a flow ratio control valve;
    a frequency converter connected to the pressure valve, and the flow ratio control valve;
    a motor connected to and controlled by the frequency converter;
    a hydraulic pump connected to the motor;
    means for analyzing injection molding conditions and procedures for controlling operation of the pressure valve and the flow ratio control valve; and
    an injection molding machine controller for controlling the injection molding machine and the frequency converter, the injection molding machine controller setting a maximum output frequency for the frequency converter and a maximum flow for the hydraulic pump based on a type of the injection molding machine and procedures for injection molding, preventing inappropriate operation of a user and avoiding waste of energy; the injection molding machine controller further setting a maximum speed and a minimum speed of the motor and setting a maximum speed and a minimum speed of the hydraulic pump;
    wherein when a required flow is below output of the minimum speed of the hydraulic pump, the injection molding machine controller makes the frequency converter output a minimum frequency to control the motor and the hydraulic pump to operate at the minimum speeds of the motor and the hydraulic pump;
    wherein the injection molding machine controller controls the flow ratio control valve to control the required flow of a motion;
    wherein when the required flow is higher than the output of the minimum speed of the hydraulic pump, an actual flow is controlled by the frequency converter that controls operation of the motor and the hydraulic pump;
    wherein when a pressure required in the motion is low, the injection molding machine controller increases the frequency of the frequency converter and controls the motor and the hydraulic pump to increase the output of the hydraulic pump within the maximum speed of the hydraulic pump, thereby increasing the speed.

2. The injection molding system as claimed in claim 1 further comprising a speed-up key for increasing the frequency of the frequency converter, increasing the speed of a motion at low pressure, and shortening a period of the motion.

3. The injection molding system as claimed in claim 1 wherein the injection molding machine has a slope of motion the same as that of the frequency converter.

* * * * *